United States Patent [19]
Abraham

[11] Patent Number: 4,756,491
[45] Date of Patent: Jul. 12, 1988

[54] DIPSTICK RETAINER

[76] Inventor: Frederic C. Abraham, 21 W. Parkway, Pequannock, N.J. 07440

[21] Appl. No.: 891,621

[22] Filed: Aug. 1, 1986

[51] Int. Cl.⁴ .............................................. B64D 47/00
[52] U.S. Cl. ............................. 244/1 R; 33/126.7 R; 123/196 S; 123/198 D; 184/105.1; 184/1.5; 296/1 C
[58] Field of Search ................. 244/1 R, 53 R, 129.1; 33/126.7; 141/379, 381; 296/1 C; 280/152 A; 180/286, 69.24; 123/196 S, 198 D; 184/105.1, 1.5; 248/544, 316.7, 309.1; 73/290 R; 340/52 D, 680; 220/DIG. 33

[56] References Cited

U.S. PATENT DOCUMENTS

| 1,526,659 | 2/1925 | Bogart | 33/126.7 A |
| 1,718,316 | 6/1929 | Swenson | 248/316.7 |
| 3,058,353 | 10/1962 | Irwin | 33/126.7 R |
| 3,131,000 | 4/1964 | Pierce | 296/1 C |

FOREIGN PATENT DOCUMENTS

| 566593 | 4/1958 | Belgium | 248/316.7 |
| 2400757 | 7/1975 | Fed. Rep. of Germany | 296/1 C |

OTHER PUBLICATIONS

*Private Pilot*, "Plane Tips", p. 57, Nov. 1985.

Primary Examiner—Galen Barefoot
Attorney, Agent, or Firm—Gerald E. Linden

[57] ABSTRACT

At least one hook or clip is mounted to the inside surface of the engine compartment hatch door so as to removably receive the engine oil dipstick so that the dipstick protrudes beyond an edge of the hatch door and prevents its full closure.

4 Claims, 2 Drawing Sheets

DIPSTICK RETAINER

TECHNICAL FIELD OF THE INVENTION

The invention relates to piston engine aircraft and, more particularly, to the engine oil dipstick.

BACKGROUND OF THE INVENTION

It is customary to check the oil level in a piston engine aircraft engine prior to takeoff. This involves opening a hatch door on the engine cowling, removing the dipstick, checking the oil level on the dip stick, and adding oil as required. While adding oil, the pilot (or mechanic) cannot return the dipstick to its appropriate location (hole) in the engine, since the dipstick hole is used for adding oil. Therefore, pilots have been known to set the dipstick aside while adding the oil, and subsequently forget to replace the dipstick into the engine. This of course results in oil escaping from the engine during flight, and consequent emergency situations.

DISCLOSURE OF THE INVENTION

Therefore, it is an object of this invention to prevent the inadvertent omission by the pilot to replace the dipstick in the engine once he has removed it therefrom.

According to the invention at least one hook or clip is mounted to the inside surface of the engine compartment hatch door so as to removably receive the engine oil dipstick in such an orientation that the dipstick protrudes beyond an edge of the hatch door and prevents it full closure. By placing the dipstick in these clips a visual reminder to replace it into the engine is also provided.

Other objects, features, and advantages of the invention will become apparent in light of the following description thereof.

BEST MODE FOR CARRYING OUT THE INVENTION

Figure 2:
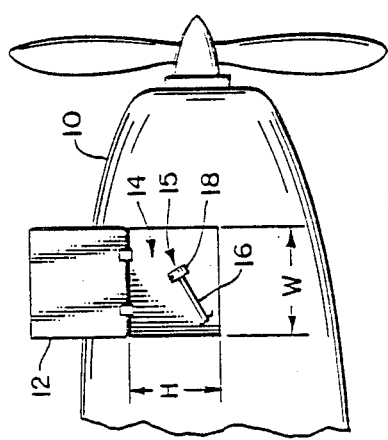
FIG. 2 is a side view of the engine compartment of FIG. 1 showing an upwardly-opening hatch door in its open position.
Figure 1:
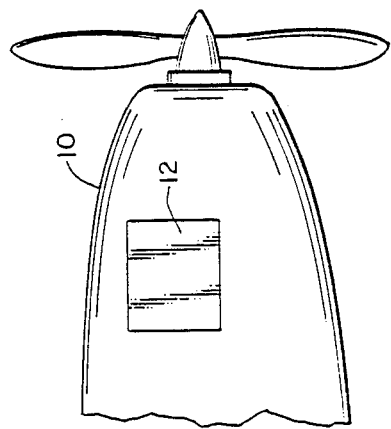
FIG. 1 is a side view of the exterior of an aircraft engine compartment.

FIGS. 1-5 show the engine cowling 10 of an aircraft, wherein there is disposed a hatch door 12 for engine oil level inspection and addition. FIG. 1 shows the hatch door 12 in a closed position. Typically, as shown in FIG. 2, the hatch door 12 opens upward, exposing the engine compartment via an opening 14 of width W and heigh H through which the dipstick may be withdrawn.

The dipstick 15 is an elongated rod of length L and diameter d, with a region of increased diameter D at one end thereof. The smaller diameter (d) portion 16 of the dipstick fits into a hole (not shown) in the engine, and the larger diameter (D) portion 18 of the dipstick serves as a stop and a handle.

Figure 3:
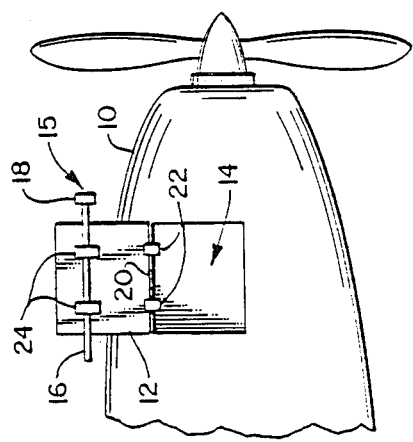
FIG. 3 is a side view of the engine compartment of FIG. 2 showing the dipstick retainer of this invention.

FIG. 3 shows an upward opening hatch door 12. One edge 20 of the hatch door 12 is pivotally attached to the engine cowling 10 via hinges 22. Two hooks 24 are disposed on the inside surface of the hatch door 12 at two spaced-apart points along a horizontal line parallel to the hinged edge 20 of the hatch door 12.

When adding oil, the pilot would place the portin 16 of dipstick 15 on or across the hooks 24 that its ends protrude past the respective edges of the hatch door 12 (The dimension L is greater than the dimension W.). As is readily imagined, the dipstick thusly disposed would prevent the hatch door from being fully closed. This is intended to provide a convenient place for dipstick stowage during oil addition and to give a visual and/or tactile clue to the pilot to replace the dipstick in the engine prior to closing the hatch door.

Figure 4:
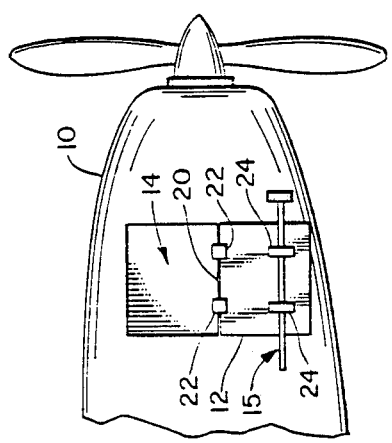
FIG. 4 is a side view of the engine compartment of FIG. 1 showing a downwardly-opening hatch door in its open position and showing the dipstick retainer of this invention.

Similarly, for a downward opening hatch door 12, as shown in FIG. 4, the dipstick 15 lays across two spaced-apart hooks 24. For either the upward or downward opening hatch doors of FIGS. 3 and 4, it is anticipated that a single hook of the type shown in FIG. 7 would properly retain the dipstick.

Figure 5:
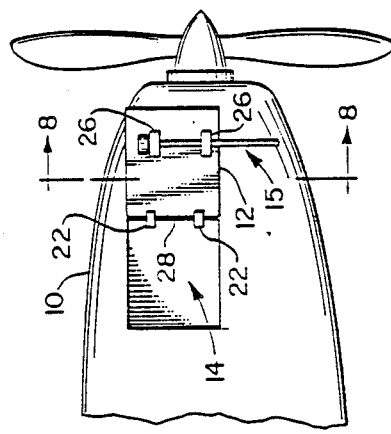
FIG. 5 is a side view of the engine compartment of FIG. 1 showing a horizontally-opening hatch door in its open position and showing the dipstick retainer of this invention.

In the case of a horizontally opening hatch door 12, as shown in FIG. 5, two hooks 26 are disposed on the inside of the hatch door at two spaced-apart points along a vertical line parallel to the hinged edge 28 of the hatch door. In this case, the hooks 26 should be of the closed-loop type, having a loop of dimension greater than d but less than D so that the dipstick 16 can be inserted vertically downward through the hooks 26, and held in place thereby with at least its lower end protruding past the lower edge of the hatch door to prevent its closing. (Typically, the dimension L is greater than the dimension H.) A single loop-type hook 26 would readily perform the desired task.

In any case (FIGS. 3-5), the hooks are readily attached, such as by rivets, to the inside surface of the hatch door (the surface towards the engine and away from the airstream when the hatch door is closed).

Figure 8:
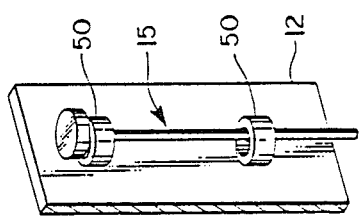
FIG. 8 is a section taken through 8—8 of FIG. 5 more particularly detailing an alternate embodiment of the dipstick retainer of this invention.
Figure 7:
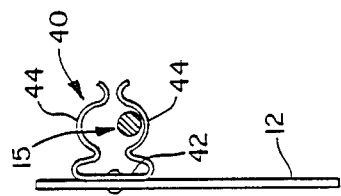
FIG. 7 is a front view of the hatch door of FIGS. 3 or 4 more particularly detailing the dipstick retainer of this invention.
Figure 6:
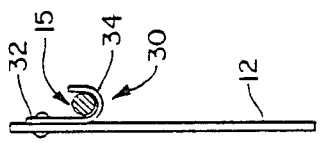
FIG. 6 is a front view of the hatch door of FIGS. 3 or 4 more particularly detailing the dipstick retainer of this invention.

FIGS. 6-8 show suitable hooks for this invention.

In FIG. 6, the hook 30 is a J-hook riveted at its flat portion 32 to the cowling and receiving the dipstick 15 in its curved portion 34. The hook 30 is suitable for the hooks 24 of FIGS. 3 and 4.

In FIG. 7, the hook 40 is a spring steel tool clip of the type having a flat base portion 42 and two arcuate portions 44, each extending at one end from an end of the base portion and resiliently contacting each other at their other ends to form a resiliently openable closed loop. The hook 40 is riveted to the hatch door 12 at its base portion 42. The hook 40 is suitable for the hooks 24 of FIGS. 3 and 4, and for the hooks 26 of FIG. 5. When used for the hooks 24 of FIGS. 3 and 4, only one hook 40 may be required.

In FIG. 8, the hook 50 is simply a loop, or band, riveted to the inside surface of the hatch door 12, as shown.

I claim:

1. Apparatus for removably receiving an engine oil dipstick of an aircraft having an engine compartment hatch door, said dipstick having a rod portion of length greater than the height or width of the hatch door, comprising:
   at least one hook or clip mounted to the inside surface of the engine compartment hatch door, said at least one hook or clip suitably dimensioned and positioned so as to removably receive the rod portion of the engine oil dipstick in an orientation that the dipstick is parallel to the inside surface of the door and protrudes beyond an edge of the hatch door and prevents its full closure.

2. Apparatus according to claim 1 wherein the hatch door opens vertically upward or downward via a hinged edge, and wherein two hooks or clips are mounted to the inside surface of the hatch door at two spaced-apart points along a horizontal line parallel to the hinged edge of the hatch door to receive the dipstick in a horizontal orientation parallel to the hinged edge of the hatch door, the length of the dipstick being greater than the width of the hatch door.

3. Apparatus according to claim 1 wherein the hatch door opens horizontally via a hinged edge, and wherein two hooks or clips are mounted to the inside surface of the hatch door at two spaced-apart points along a vertical line parallel to the hinged edge of the hatch door to receive the dipstick in a vertical orientation parallel to the hinged edge of the hatch door, the length of the dipstick being greater than the height of the hatch door.

4. A method of preventing the inadvertent omission to replace the engine oil dipstick in the engine of an aircraft having an engine compartment hatch door, comprising:
   mounting at least one hook or clip to the inside surface of the hatch door;
   opening the hatch door;
   removing the dipstick from the engine;
   placing the dipstick in, on, or across the at least one hook so that the dipstick is parallel to the inside surface of the hatch door and at least one end of the dipstick protrudes past an edge of the hatch door, thereby preventing the hatch door from being fully closed with the dipstick so received by the at least one hook.

* * * * *